No. 789,386. PATENTED MAY 9, 1905.
R. H. RYAN.
PENCIL.
APPLICATION FILED FEB. 7, 1905.
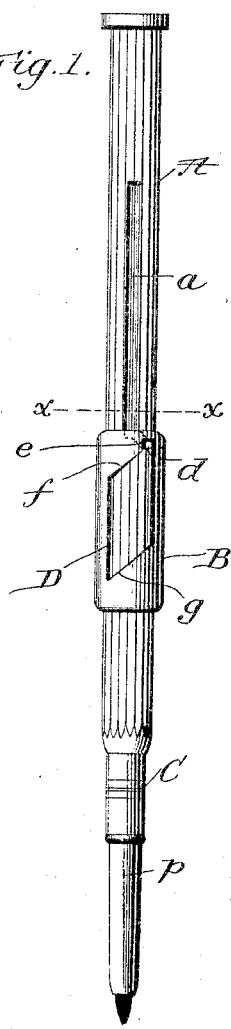
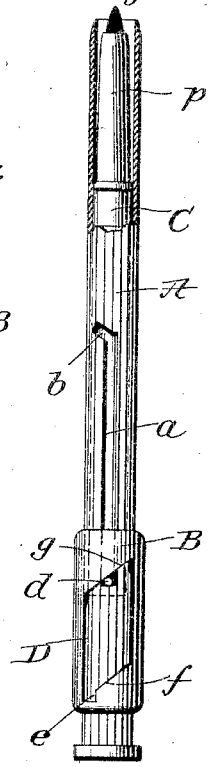
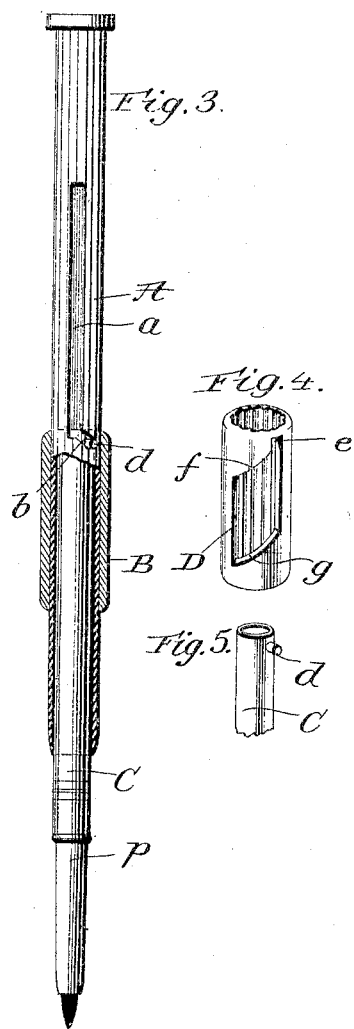
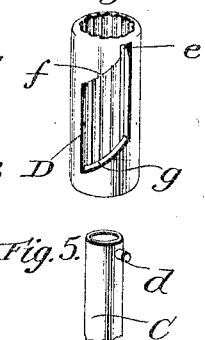
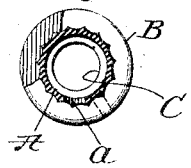
Witnesses
Inventor:
Richard H. Ryan,
By Dodge and Sons,
Attorneys.

No. 789,386.                                                    Patented May 9, 1905.

UNITED STATES PATENT OFFICE.

RICHARD H. RYAN, OF BROOKLYN, NEW YORK, ASSIGNOR TO WILLIAM S. HICKS' SONS, OF NEW YORK, N. Y., A FIRM.

PENCIL.

SPECIFICATION forming part of Letters Patent No. 789,386, dated May 9, 1905.

Application filed February 7, 1905. Serial No. 244,575.

*To all whom it may concern:*

Be it known that I, RICHARD H. RYAN, a citizen of the United States, residing at 592 Jefferson avenue, borough of Brooklyn, in the county of Kings and State of New York, have invented certain new and useful Improvements in Pencils, of which the following is a specification.

My present invention relates to that class of pencils known as "gravity-pencils;" and it consists in certain improvements hereinafter more fully described, reference being had to the accompanying drawings, illustrating the same, wherein—

Figure 1 is a side elevation showing the pencil-point projected ready for use. Fig. 2 is a similar view showing the pencil inverted and the pencil-point retracted. Fig. 3 is a side elevation having a portion shown in section. Fig. 4 is a perspective view of the gravity-sleeve detached, showing a modification of the fluting or grooves on its interior. Fig. 5 is a similar view of the upper portion of the pencil-carrier, and Fig. 6 is a transverse section on the line $x\ x$ of Fig. 1 looking from above downward. All the figures are enlarged.

To construct my improved pencil-case, I provide a tube A, usually termed the "barrel," the exterior surface of which is fluted or formed with longitudinal grooves and ribs, as shown in Figs. 1, 3, and 6, these grooves and ribs being made by drawing the tube, with a smooth mandrel or rod inside, through a die having correspondingly-shaped grooves and ribs on its interior face. In this barrel I cut a longitudinal slot $a$, as shown in Figs. 1, 2, and 3, which slot terminates at its lower end in a short diagonal slot or recess $b$. (Shown most clearly in Fig. 2.) I then provide what I term the "gravity-sleeve" B, which is a short tube. (Shown detached in Fig. 4.) This sleeve is provided on its inner surface with longitudinal grooves and ribs to correspond with those on the barrel A, and it is made of such diameter as to fit and slide loosely thereon. These grooves and ribs are formed by placing a mandrel or rod provided on its exterior with corresponding ribs and grooves within the tube and then drawing the two through a smooth die or draw-plate of the proper size. To complete the sleeve, a longitudinal slot D is cut in one side thereof, the ends of the slot being inclined, as shown at $f$ and $g$, Figs. 1, 2, and 4. At its upper end, where the incline $f$ terminates, a short longitudinal cut or recess $e$ is formed, the sides of which are perpendicular, the object of which is to form a locking device, as hereinafter explained. A pencil-carrier C is provided, which consists of a smooth tube of the proper size to fit and slide freely within the barrel A, as shown in Figs. 1, 2, and 3, it being provided with the usual detachable point $p$ for holding the lead. At or near the upper end of this carrier C a hole is made for a pin $d$, which is shown in place in Figs. 1, 2, 3, and 5. Having thus constructed the several parts, they are assembled by slipping the sleeve B on the barrel A, then placing the carrier C in said barrel in such a position that the hole for the pin $d$ will be in line with the slot $a$ of the barrel and the slot D of the sleeve, when the pin $d$ is screwed or otherwise fastened in the hole with its outer end flush with the exterior surface of sleeve B, or practically so, as shown in Figs. 1, 2, and 3. With the parts thus arranged when it is desired to project the pencil-point for use it is only necessary to hold the pencil right end up, as represented in Fig. 1, when the carrier C will slide downward until the pin $d$ reaches the lower end of the slot $a$, the sleeve B at the same time sliding down, when its incline $f$ resting on the pin $d$ forces the latter into the inclined portion or recess $b$ of the slot, as shown in Fig. 3, which brings the pin in line with the recess $e$ in the upper portion of sleeve B, the vertical faces of said recess thus locking the pin $d$ in the recess $b$ and holding the carrier C securely in its projected position ready for use. To retract the carrier C, it is only necessary to turn the pencil the other end up, as represented in Fig. 2, when the sleeve B sliding on the barrel until its incline $g$ comes into contact with the pin $d$ forces it out of the recess $b$ into the slot $a$, when both sleeve and carrier will slide to the position shown in Fig. 2.

An important feature of my invention is the longitudinal fluting or grooving of the barrel and sleeve, as described, whereby the sleeve is left free to slide on the barrel, but is prevented from rotating thereon. The multiplicity of these grooves and ribs prevents the possibility of the sleeve becoming so loose by use as to turn on the barrel, it being absolutely necessary that the sleeve be prevented from turning on the barrel in order to lock and securely hold the carrier when projected for use. It is obvious that this fluting of the barrel and the sleeve may be done by cutting the grooves in the metal; but I prefer to make them by the drawing process, as described, since it is not only cheaper, but leaves the fluted surfaces both smoother and harder, as the metal is compressed by the action thereon of the dies or draw-plates in the operation of drawing.

It is obvious that the fluting of the sleeve may be formed by a series of convex ribs with intervening grooves, as shown in Fig. 6, or with a series of concave grooves with interposed projections or ribs, as shown in Fig. 4, the only requisite being that the fluting on the barrel shall be the reverse of that in the sleeve, the one being the counterpart of the other, as is illustrated in Fig. 6.

The sleeve is made of thicker metal than the barrel, thereby increasing its weight, and by extending the slot in the barrel the proper distance the sleeve when the pencil is closed will slide to the extreme end, or nearly so, and as a result it will have a greater distance to move when the point is projected, and this increase of weight and travel causes it to act with certainty on the pin $d$ of the pencil-carrier to force it into the angular recess or slot of the barrel, where it is securely locked by the vertical slot $e$ at the upper end of the sleeve, thus holding the parts rigidly and securely in place.

It will of course be understood that an outer case will be secured to the barrel in the usual manner, which may be ornamented in any desired style.

Having thus fully described my invention, what I claim is—

1. The combination in a gravity-pencil, of a tubular barrel having its outer face fluted or grooved longitudinally, and a sleeve having its inner face correspondingly fluted or grooved longitudinally, arranged to slide freely on said barrel, substantially as shown and described.

2. The combination of the fluted barrel A, provided with the longitudinal slot $a$ and inclined recess $b$; the fluted sleeve B, provided with the slot D, inclines $f$ and $g$, and recess $e$; and the carrier C provided with pin $d$, all constructed and arranged to operate substantially as shown and described.

In testimony whereof I have signed my name to this specification in the presence of two subscribing witnesses.

RICHARD H. RYAN.

Witnesses:
OSCAR R. WILCOX,
JAMES J. DONOVAN.